United States Patent

Fujioka et al.

[11] Patent Number: 5,153,491
[45] Date of Patent: Oct. 6, 1992

[54] MAIN SPINDLE CONTROL METHOD

[75] Inventors: Yoshiki Fujioka, Yamanashi; Hironobu Takahashi, Fukuoka, both of Japan

[73] Assignee: Fanuc Ltd., Minamitsuru, Japan

[21] Appl. No.: 721,446

[22] PCT Filed: Oct. 15, 1990

[86] PCT No.: PCT/JP90/01327

§ 371 Date: Jul. 1, 1991

§ 102(e) Date: Jul. 1, 1991

[87] PCT Pub. No.: WO91/07008

PCT Pub. Date: May 16, 1991

[30] Foreign Application Priority Data

Nov. 2, 1989 [JP] Japan .................. 1-284834

[51] Int. Cl.⁵ .................. G05B 19/33; G06F 15/46
[52] U.S. Cl. .................. 318/578; 318/571; 318/800; 318/806; 364/474.3; 364/474.03
[58] Field of Search .................. 318/560-578, 318/798-820; 364/474.01-474.32

[56] References Cited

U.S. PATENT DOCUMENTS

| 4,224,670 | 9/1980 | Yamazaki | 318/578 X |
| 4,357,664 | 11/1982 | Imazeki et al. | 318/578 X |
| 4,386,408 | 5/1983 | Imazeki et al. | 318/578 X |
| 4,412,295 | 10/1985 | Imazeki et al. | 318/571 X |
| 4,646,225 | 2/1987 | Matsuura | 318/578 X |
| 4,672,287 | 6/1987 | Fujioka et al. | 318/800 |
| 4,757,248 | 7/1988 | Fujioka et al. | 318/807 |
| 4,823,066 | 4/1989 | Yoshiki et al. | 318/798 |
| 4,967,127 | 10/1990 | Ishiguro et al. | 318/571 |

Primary Examiner—Paul Ip
Attorney, Agent, or Firm—Staas & Halsey

[57] ABSTRACT

A spindle motor control method capable of high-accuracy contour machining uses a vector control processor executing a speed loop process to obtain a torque command (Tc). Vector control is performed (S4, S7) in accordance with a magnetic flux command (Φc) set at a predetermined fixed value (CFΦ) when a spindle motor is being driven in a contour control mode. This prevents irregularity in motor speed and motor vibration attributable to a delay of the actual magnetic flux of the spindle motor behind the magnetic flux command, thus enabling high-accuracy contour machining. In a normal speed control mode or an orientation mode for tool replacement, the vector control is effected (S4 to S6, S8) in accordance with the magnetic flux command (Φc), which is obtained on the basis of the torque command (Tc), its maximum value (Tcmax), maximum magnetic flux command (Φcmax) set in dependence on the rotating speed of the motor, and minimum magnetic flux (NRΦcmin, ORΦmin).

1 Claim, 2 Drawing Sheets

MAIN SPINDLE CONTROL METHOD

BACKGROUND OF THE INVENTION

1. Field of the Invention

The present invention relates to a vector control method for a spindle motor, and more particularly, to a control method for a spindle motor capable of high-accuracy contour machining.

2. Description of the Related Art

It is known to perform vector control for speed control of a spindle motor mounted in a machine tool, which motor is comprised of a thee-phase induction motor, for instance. As shown in FIG. 2, a conventional vector control apparatus comprises a speed controller 1 operable to perform proportional-plus-integral control in accordance with a deviation between a speed command $\omega c$ and an actual speed $\omega r$ of a spindle motor (not shown) detected by a speed sensor (not shown) to thereby obtain a torque command Tc, and magnetic flux command means 2 for obtaining a magnetic flux command $\Phi c$ in accordance with the torque command Tc and the motor speed $\omega r$.

A curve (FIG. 3) which indicates the maximum value $\Phi cmax$ of the magnetic flux command, represented as a function of the motor speed $\omega r$, and the minimum value $\Phi cmin$ of the magnetic flux command are set beforehand in the magnetic flux command means 2. The maximum magnetic flux command curve is set so as to take a fixed value $\Phi max$ in a region where the motor speed $\omega r$ is not higher than a magnetic flux attenuation starting speed $\omega p$ which corresponds to the DC link voltage of an inverter (not shown), and to give, in a region where the motor speed exceeds the value $\omega p$, a maximum magnetic flux command $\Phi cmax$ which is decreased as the motor speed increases. The magnetic flux command means 2 calculates the torque command Tc in accordance with equation (1), by using the maximum magnetic flux command $\Phi cmax$ obtained from the maximum magnetic flux command curve in accordance wit the motor speed $\omega r$, the torque command Tc, and the minimum magnetic flux $\Phi cmin$. As shown in FIG. 4, the magnetic flux command $\Phi c$ changes in proportion to the square root of the torque command Tc, the command being equal to the maximum magnetic flux command $\Phi cmax$ determined in dependence on the motor speed $\omega r$ when the torque command takes the maximum value Tcmax, and being equal to the minimum value $\Phi cmin$ when the torque command is zero.

$$\Phi c = \sqrt{Tc/Tcmar} \cdot (\Phi cmax - \Phi cmin) + \Phi cmin. \qquad (1)$$

Referring again to FIG. 2, secondary current command means 3 divides the torque command Tc supplied from the speed controller 1 by the magnetic flux command $\Phi c$ supplied from the magnetic flux command means 2, thereby determining a secondary current command I2C. Magnetic flux current means 4 divides the magnetic flux command $\Phi c$ by a constant k1, to determine a magnetic flux current command IO. In slip speed calculating means 5, the product of the secondary current command I2C and the rotor winding resistance R2 of the spindle motor is divided by the product of the magnetic flux command $\Phi c$ and a constant k2, thereby obtaining a slip speed $\omega s$. Driving frequency command means 6 adds the moor speed $\omega r$ to the slip frequency $\omega s$, thereby obtaining a driving frequency $\omega O$ of the spindle motor. The vector control based on the secondary current command I2C, the magnetic flux current command IO, and the during frequency $\omega O$ delivered from the elements 3, 4 and 6, respectively, is executed by means of vector control means 7, whereby a primary current command IC is generated. Induced voltage estimating means 8 for respective phases (only one for one phase is shown in FIG. 2) calculate estimated induced voltages EO or the individual phases with a phase difference of $2\pi/3$ from one another, in accordance with a constant k3 and the magnetic flux command $\Phi c$ and the driving frequency $\omega O$ delivered from the elements 2 and 6, respectively. In current controllers 9 for the individual phases (only one for one phase is shown), a current feedback value If for each phase, detected by means of a current sensor (not shown), is subtracted for the primary current command Ic supplied from the element 7, whereby a voltage command Vc for each phase is generated. Then, pulse width modulation (PWM) processing is executed in accordance with a compensated voltage command Vc, obtained by adding the estimated induced voltage EO supplied from the element 8 to the voltage command Vc supplied form the element 9, and the spindle motor is driven through the medium of the inverter.

In the machine tool equipped with the vector control apparatus of FIG. 2, the spindle motor is driven in any desired mode including a low-speed operation mode, a high-speed operation mode, an orientation mode where the spindle is positioned for automatic tool replacement, and a control control mode (Cs contour control mode) for control machining of a workpiece mounted on the spindle. Conventionally, the torque command $\Phi c$ is calculated in accordance with equation (1), irrespective of the drive mode of the spindle motor. Meanwhile, a magnetic flux actually produced in the spindle motor is subject to a delay behind the magnetic flux command $\Phi c$ due to the presence of inductance. As a result, them toro speed is subject to irregularity, so that vibration occurs in the motor. In the high-speed operation mode or the orientation mode, the irregularity of the motor speed causes no substantial hindrance. In the low-speed operation mode, however, the irregularity of the motor speed attributable to the delay of the actual magnetic flux makes it difficult to effect positioning control with required accuracy. Also in the Cs control control mode, which requires accuracy about 100 times as high as the positioning accuracy for the orientation mode, control machining with the required accuracy sometimes cannot be achieved due to the delay of the actual magnetic flux.

SUMMARY OF THE INVENTION

The object of the present invention is to provide a spindle motor control method capable of performing highly accurate position control of a spindle motor in a control control mode.

In order to achieve the above object, according to the present invention, there is provided a spindle motor control method for effecting vector control of a spindle motor y changing a magnetic flux command value in dependence on a torque command value. This control method comprises the steps of: (a) determining whether or not a spindle motor is being driven in a contour control mode where a workpiece mounted on a spindle is subjected to contour machining while the spindle motor is being operated at low speed; and (b) fixing the magnetic flux command value to a predetermined fixed value during the contour control mode.

Since the magnetic flux command value is fixed to the predetermined fixed value during the contour control mode, as described above, the actual magnetic flux never changes even when the torque command changes, so that the spindle motor speed can be prevented from becoming irregular due to a change of the actual magnetic flux. Thus, the position control of the spindle motor can be highly accurately effected in the contour control mode, so that the contour machining can be executed with high accuracy.

DESCRIPTION OF THE PREFERRED EMBODIMENT

Figure 2:
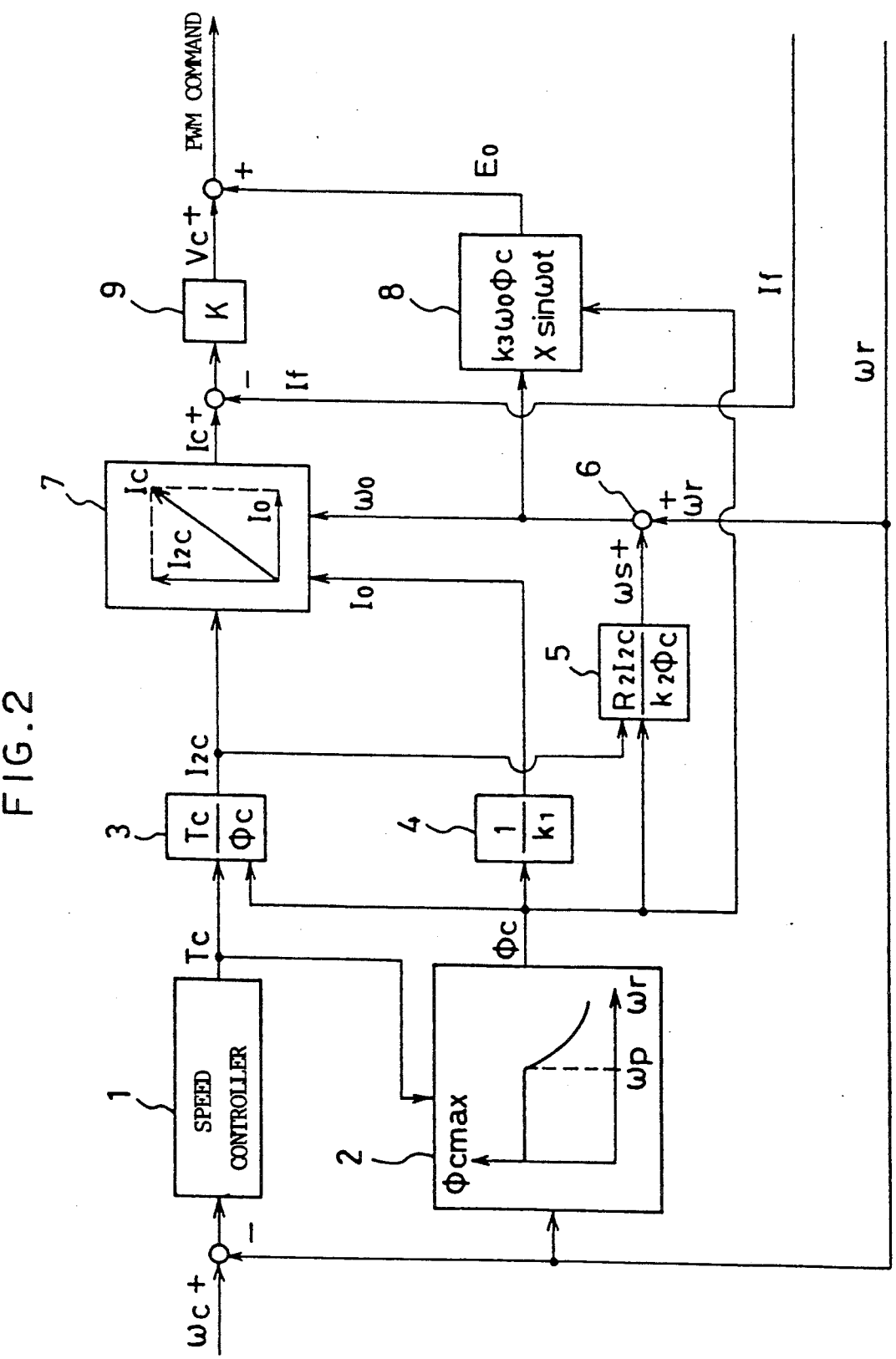
FIG. 2 is a block diagram showing a vector control apparatus.

A spindle motor control method according to the present invention is embodied by a vector control apparatus (not shown), for instance, which includes a processor operable to fulfill, by means of software processing, the respective functions of various elements shown in FIG. 2. The vector control apparatus, which is mounted to, e.g., a machine tool (not shown), is arranged to drive a spindle of the machine tool in any drive mode including a normal speed control mode, an orientation mode, and a control control mode (Cs contour control mode), in accordance with a machining program, and load a built-in register thereof with code information which is indicative of the current drive mode specified by the machining program.

Figure 1:
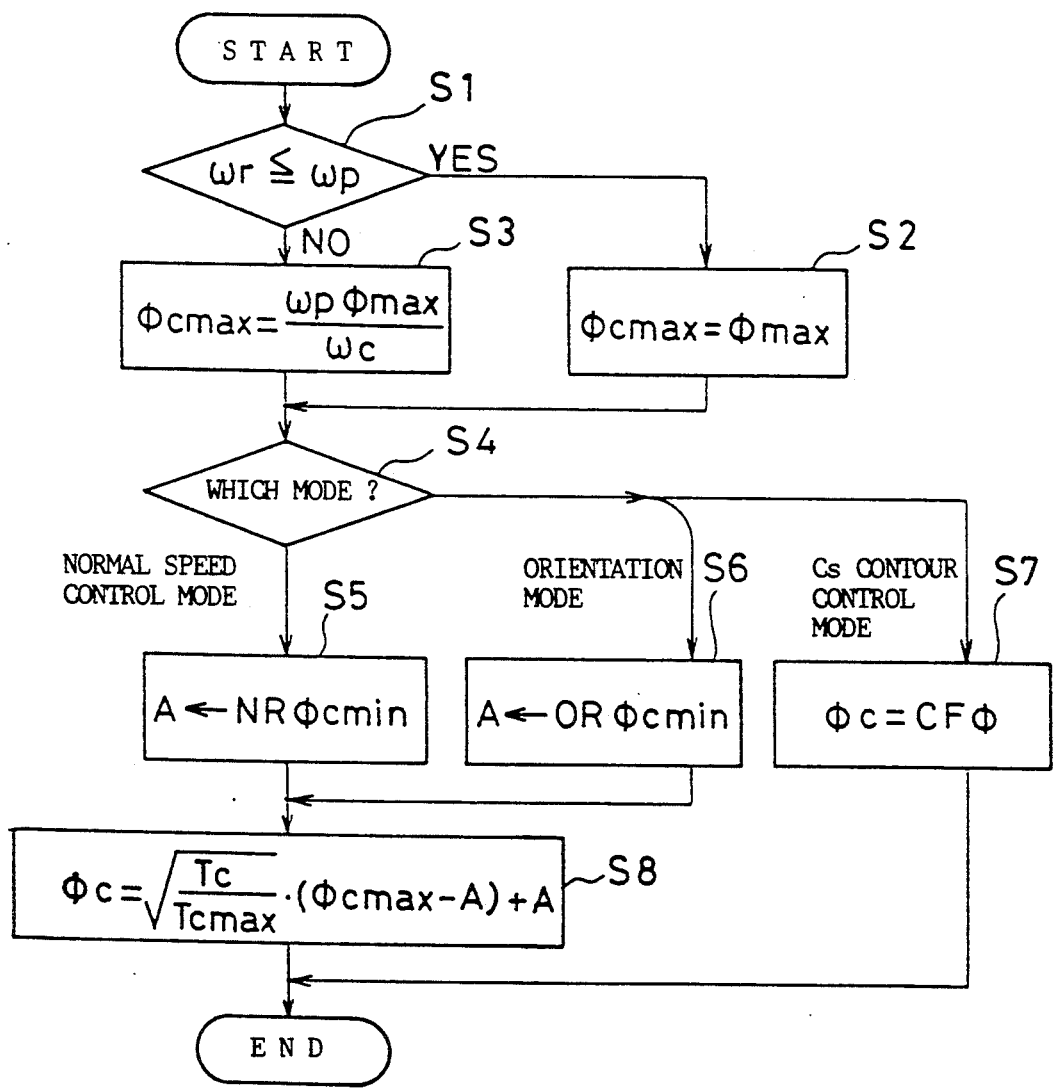
FIG. 1 is a flow chart showing a magnetic flux calculation process in a spindle motor control method according to one embodiment of the present invention.
Figure 3:
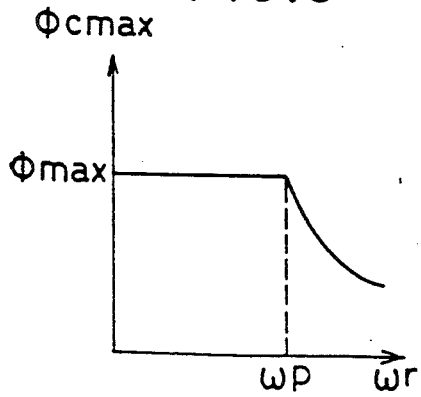
FIG. 3 is graph showing a maximum magnetic flux command curve used in a conventional magnetic flux calculation process.
Figure 4:
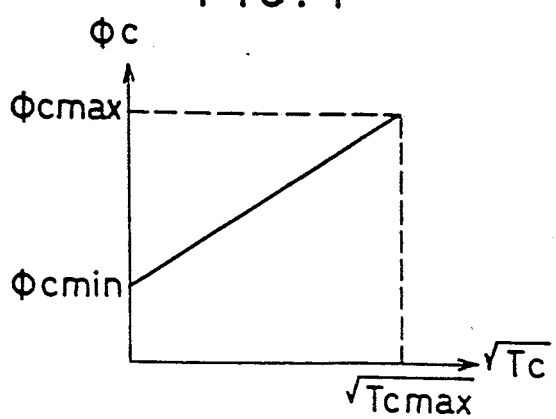
FIG. 4 is a diagram for illustrating the conventional magnetic flux calculation process

The processor for vector control is operable to execute a speed loop process at intervals of a predetermined period to thereby obtain a torque command Tc corresponding to the output of the speed controller 1 of FIG. 2, and to execute a magnetic flux calculation process of FIG. 1 in each processing period.

More specifically, the processor determines whether or not an actual motor speed $\omega r$ detected by a speed sensor (not shown), such as an encoder, is equal to or less than a magnetic flux attenuation starting speed $\omega p$ (Step S1). If the motor speed $\omega r$ is not higher than the value $\omega p$, the maximum value $\Phi cmax$ of a magnetic flux command is set at a predetermined value $\Phi max$ (Step S2). If the speed $\omega r$ exceeds the value $\omega p$, the product of the magnetic flux attenuation starting speed $\omega p$ and the predetermined magnetic flux command value $\Phi max$ is divided by the motor speed $\omega r$ to calculate the maximum magnetic flux command $\Phi cmax$ (Step S3), as indicated by equation (2).

$$\Phi cmax = \omega p \cdot \Phi max / \omega r. \qquad (2)$$

Subsequently, the processor determines whether the current spindle motor drive mode is the normal speed control mode, or the orientation mode, or the Cs control control mode (Step S4). If the drive mode is the normal speed control mode or the orientation mode, the minimum value $NR\Phi cmin$ or $OR\Phi cmin$ of the command magnetic flux for this mode is loaded into a register A (Step S5 aor S6). Then, the magnetic flux command $\Phi c$ is calculated in accordance with equation (1), by using the minimum magnetic flux $NR\Phi cmin$ or $OR\Phi cmin$, the torque command Tc obtained in the speed loop process, the maximum magnetic flux command $\Phi cmax$ obtained in Step S2 or S3, and the maximum value Tcmax of the torque command. Whereupon, conventional vector control is executed in accordance with magnetic flux command $\Phi c$.

If it is concluded in Step S4 that the current drive mode is the Cs contour control mode, on the other hand, the processor sets the magnetic flux command $\Phi c$ at a predetermined fixed value $CF\Phi$ for the Cs contour control mode, and then performs vector control in accordance with this predetermine value $CF\Phi$. during the vector control, the actual magnetic flux never changes, and a delay of the actual magnetic flux relative to the magnetic flux command $\Phi c (= CF\Phi)$ is not caused. As a result, the spindle motor suffers neither irregularity in speed nor vibration, so that contour matching can be defected with high accuracy.

What is claimed is:
1. A spindle motor control method using vector control of a spindle motor, comprising the steps of:
  (a) determining whether a spindle motor is in a contour control mode where a workpiece mounted on a spindle motor is operated at a low speed;
  (b) setting a magnetic flux command value to a predetermined fixed value during the contour control mode;
  (c) setting the magnetic flux command value in dependence on the torque command value when said determining in sep (a) determines that the spindle motor is not operating in the contour control mode; and
  (d) controlling the spindle motor in dependence upon the magnetic flux command set in one of steps (b) and (c).

* * * * *